3,151,010
METHOD OF PREPARING A SOLID COMPOSITE PROPELLANT

Charles C. Bice, Bartlesville, Okla., assignor to Phillips Petroleum Company, a corporation of Delaware
No Drawing. Filed Feb. 11, 1955, Ser. No. 487,707
5 Claims. (Cl. 149—19)

This invention relates to a mixing procedure for incorporating finely divided solids into a rubbery binder. In one of its aspects this invention relates to an improvement in the method of incorporating large volumes of finely divided solids into a polymeric binder. In a more specific aspect, this invention relates to an improved method of mixing the ingredients in the production of a propellant composition containing a rubbery binder or fuel, a plasticizer, and a crystalline oxidizing material.

In the preparation of highly filled rubbery composition, a plasticizer is usually incorporated in the polymer to improve its workability prior to adding the filler material. Where it has been required to soften the rubber with a plasticizer, the plasticizer is first completely incorporated in the rubber. The incorporation of the fill material in the thus plasticized binder requires prolonged mixing and in some cases the filler material will not incorporate. For example, in the preparation of a propellant comprising a crystalline oxidant incorporated in a rubbery binder and molded into a rocket grain, the incorporation of the crystalline oxidizer into the rubbery binder has tended to be troublesome because of the relatively large bulk of the oxidizer as compared to the bulk of the binder. In one of the commonly used procedures the oxidizer is added in increments to the binder in which the plasticizer has been previously completely incorporated with mixing taking place after the addition of each increment of oxidizer until it is completely incorporated in the plasticized rubber. After the last addition, the mixing is continued for an additional period of time in order to insure complete and even dispersion of the ingredients. This method of complete incorporation after each addition of oxidant is slow and time consuming. At times, the oxidizer fails to disperse in the binder with the resultant necessity of discarding the batch.

By binder, I mean the rubbery polymer, copolymer, or natural rubber as the case may be along with the plasticizer and curing agents which are either soluble in or reactive with the rubbery material. These materials include the rubbery material, the plasticizers, the wetting agents, quaternizing agents, vulcanizing agents, vulcanization accelerators, vulcanization activators, antioxidants etc. By filler material, I include reinforcing agents, such as carbon black, as well as other fillers such as clays, inorganic salts, silica, titania, and oxidants along with burning rate catalyst and the like.

In the preparation of highly filled rubbers, i.e., rubber compositions having from about 25 to 600 parts by volume per 100 volumes of binder of a finely divided solid material insoluble in the rubber or plasticizer (binder) incorporated therein, it has been the practice to add the plasticizer to the rubber and completely incorporate same prior to adding the filler material. The use of a plasticizer aids in masticating the rubber and minimizes heat build up upon milling. This latter factor is especially important in the preparation of solid propellants consisting primarily of a rubbery binder and a granular oxidizer. Examples of other filler materials include inert or mildly reinforcing agents such as inorganic salts like sodium or potassium chloride, wood flour, asbestos, graphite, finely divided silica, titania, clays, etc., or highly reinforcing agents such as carbon black. In addition to the solid propellant, these materials are useful in the manufacture of floor tile, chemical-resistant table tops, insulation, impact absorbers, and other construction materials. The particular use for which the material is prepared will determine the type and amount of filler material to be used.

An object of this invention is to provide an improvement in the method of incorporating filler materials in a rubbery binder.

Another object of this invention is to provide an improvement in the method of mixing a rubbery polymer with a plasticizer and finely divided solids.

Still another object of this invention is to provide an improvement in the method of incorporating an oxidant in a rubber binder for rocket fuel grain.

I have now found a method of incorporating filler material into a rubbery binder which is faster and more reliable than the heretofore used method. By operating in accordance with the method of this invention, these ingredients can be incorporated in as little as one-seventh the time, or even less, heretofore required, and, using the same proportion of ingredients, there are substantially no failures due to the filler not being completely incorporated. While the method of this invention can be used for incorporating smaller amounts of finely divided solids in the rubbery binder, I have found it particularly advantageous in preparing filled rubber containing a large volume of filler per volume of binder, e.g., 25 to 600 volumes of filler per 100 volumes of binder. This method consists of wetting the filler material with plasticizer and dispersing the wetted filler material in the rubber. By volume ratios, I mean the particulate volume, e.g., the apparent volume as would be determined by displacing the particular binder by the filler. It is well known, for example, that the binders are not free flowing liquids, and will not fill fine voids etc. and also filler materials having voids therein will have a considerable lower particulate density than is the theoretical or absolute density of the material. The particulate volume then is the weight divided by the apparent or particulate density as if determined in the binder. It is also well understood in the art that in the case of inert fillers, there is no problem in incorporating as little as 25 volumes of filler per 100 volumes of binder and the process of this invention would not be required. On the other hand, highly reinforcing fillers such as carbon black can generally not be incorporated in more than 150 volume parts per 100 parts of binder and are generally used in no more than 75 parts per 100 parts binder. In any case, for such highly reinforcing materials, the method of this invention will be found useful when as little as 25 volume parts filler is to be incorporated in 100 parts binder. The volume parts filler is based on the total filler material, some of which may have been already incorporated prior to the application of this invention. This is illustrated by the workng example of this specification wherein the carbon black is in the rubbery copolymer starting material and the milori blue is incorporated prior to the use of this invention for incorporating the ammonium nitrate. It will also be understood by those skilled in the art that, the particle size and shape will influence the total amount of filler which can be incorporated into a given volume of binder. Larger volumes of spheres and cubes can be incorporated than can be incorporated if the filler material is needle shaped. Also, it is understood by those in the art, that larger volumes of material having ideal particle size distribution can be incorporated than can material having a more uniform particle size. The amount of plasticizer required will be dependent upon the particular binder and the desired properties will, in any case, be sufficient to wet all of the filler material. One convenient method of operating is to add the plasticizer to the rubber in an appropriate type mixer (i.e., any of the well known rubber blending mixers commercially available) and continuing the mixing only until a small fraction of the plasticizer has been incorporated into the rubber with the rubber remaining as lumps in the unincorporated plasticizer. In a Baker-Perkins dispersion blade mixer this time will generally be about one minute. The filler material is then added in increments, with mixing of each increment continuing only long enough for the particles or agglomerates of the particles of the added portion to become wet with the plasticizer and not long enough for the added particles to be completely incorporated into the rubber, this time usually being less than one minute. Only a small portion of the filler is incorporated into the rubber during this brief mixing period. After the last portion has been added, mixing is continued until all of the oxidizer and plasticizer has been completely incorporated. This occurs in a surprisingly short time, usually in a matter of two or three minutes in a Baker-Perkins dispersion blade mixer equipped with a pressure ram. The time from the addition of the first portion of the filler material to the complete incorporation can often be accomplished in one-seventh, or even less, of the time required by the older mixing method, with resultant economy in the cost of production. For example, when mixing a given rubber binder with an oxidizer by the method of this invention, the time required was about 5 minutes for incorporating the oxidizer while 35 minutes was required by the older method wherein the plasticizer is first completely incorporated followed by the addition of the oxidizer or filler. Still another method of operation is to first blend the plasticizer and filler material and then to add these blended ingredients to the rubber either in a single addition or in increments. When the filler material is first blended with the plasticizer, the blend will generally be added in one increment. By operating in this last said method, considerable time would be saved in a large scale commercial operation.

In addition to the rubbery material, the filler, and the plasticizer, various other materials may be incorporated into the propellant composition, such as combustion catalysts, quaternizing agents, wetting agents, vulcanizing agents, vulcanization accelerators, vulcanization activators, antioxidants, etc. Here again, the properties desired will determine the amount and type of ingredients to be incorporated. A part or all of these ingredients may be added to the rubber before the filler and plasticizer have been incorporated into the rubber, or a part or all may be added to the mixture after the filler and plasticizer have been incorporated into the rubber. Any free flowing solids may first be mixed with the oxidizer and added simultaneously with it, providing that the combined volume of all solids does not exceed 600 volumes solids to be mixed with 100 volumes binder. Other liquids may first be mixed with the plasticizer and be added simultaneously with it. The ingredients may be added alone, with a short period of mixing following each addition, or two or more may be added simultaneously. The order in which they are added can be varied according to well known procedures. However, for each specific composition, there may be a preferred method. One method generally preferred is to add to the mixer (a) the uncompounded rubber material, (b) compounding ingredients not otherwise listed, (c) plasticizer and filler material as described, (d) vulcanizing agent or vulcanizing activator as the last ingredient after the filler material is incorporated. In the case where a quaternizing agent is used, it can also be added after the filler material has been added.

While the mixing process is described as a batch process, the ingredients can be added in a continuous operation. In the latter case, the filler and plasticizer will usually be blended and the resulting blend added to the compounding mill.

The rate of mixing must not be so high as to raise the temperature of the mass above about 350° F. or the temperature at which either oxidation might begin to occur (especially in case of propellant), or if vulcanizing or quaternizing agent are present, at which scorch or quaternization of the binder might occur during processing. Preferably, in the case of propellants the temperature of the mixture is maintained between 70 to 200° F. although higher or lower temperatures can be employed, e.g., —40° F. to 350° F. The rate of mixing can be increased if effective cooling means are supplied as, for example, by a cooling jacket surrounding the mixer through which cooling water is circulated.

The mixing can be accomplished in mixers of the kneader type such as those with vertically or horizontally mounted blades that include bread dough mixers, sigma blade mixers, and rubber masticators or Banbury type mixers. It is desirable that these be fitted with interchangeable attachments such as compression rams, vacuum heads, etc. That is, a compression ram exerting considerable force on the ingredients can be advantageously applied to the ingredients during the final mixing stage, followed by the application of a partial vacuum to the mix to remove entrained air and moisture.

The binder, or fuel, applicable to the method of this invention is a rubbery material of a consistency such that it can be masticated readily by the mixer. Rubbery materials with Mooney values (ML–4) of from 10 to 60 before curing are generally used, though rubbery materials having lower or higher Mooney values say up to 75 or even higher can be used. Among the types of rubbery materials which are useful, the following can be mentioned; natural rubber, silicone rubber, polybutadiene, butadiene-styrene copolymer, butadiene acrylonitrile copolymer, butadiene-ethylvinylpyridine copolymer, butadiene-2-methyl-5-vinylpyridine copolymer and others. In general any rubbery material can be used as the binder but the natural rubbers and polymers of conjugated dienes containing 4 to 12 carbon atoms per molecule and copolymers of these conjugated dienes with monomeric material copolymerizable therewith are generally preferred. In the case of the conjugated diene copolymers, the conjugated diene generally constitute at least 50 percent by weight of the copolymer. By the way of example the following conjugated dienes can be mentioned: 1,3-butadiene, 2,3-dimethyl-1,3-butadiene, 2-phenyl-3-ethyl-1,3-butadiene, 2,3-dipropyl-1,3-butadiene, isoprene, piperlene, 3-furyl-1,3-butadiene, 2-methoxy-1,3-butadiene, chloroprene, bromoprene, methylchloroprene and the like. These materials can contain a reinforcing agent or other filler such as carbon black or they can be free of such materials. That is a reinforcing agent may have been incorporated prior to this mixing step such as by having the material incorporated in the latex (e.g., carbex).

In producing the propellant binder, a copolymer of a conjugated diene and a heterocyclic nitrogen containing monomer is ordinarily used. The copolymer generally used consists of 5 to 25 parts by weight of a polymerizable heterocyclic nitrogen base, particularly alkyl substituted monovinylpyridines together with 75 to 95 parts by weight of a conjugated diene having 4 to 8 carbon atoms, specifically butadiene, 1,3-butadiene-2-methyl-5-vinylpyridine copolymer is a preferred binder for use in solid propellants.

Monomers copolymerizable with conjugated dienes are those having a $CH_2=C<$ group and includes aryl olefins; acrylic and substitute acrylic acids and their esters; vinyl ethers; vinyl ketones; unsaturated nitriles; and unsaturated amides. Examples of such copolymerizable monomers include styrene, various alkyl styrenes, p-chlorostyrene, p-methoxystyrene, alpha-methylstyrene, vinylnaphthalene, acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide, methylisopropenyl ketone, methyl vinyl ketone, methyl vinyl ether, vinyl acetate, vinyl chloride, vinylidene chloride, vinylfurane, vinylcarbazole, vinylacetylene and the like. The conjugated dienes can also be copolymerized with each other. In general, the conjugated diene will be copolymerized with a copolymerizable monomer containing at least one $CH_2=C<$ group. The copolymers of the above monomers with at least 50 percent conjugated dienes are generally rubbery even after vulcanization. However, extremely hard rubbers can be produced by proper choice of polymer and vulcanization.

When it is desired that the binder be of a resinous nature the conjugated diene can be copolymerized with a monomer containing a heterocyclic nitrogen base of the pyridine or quinoline series. Such material can be quaternized by the use of a suitable quaternizing agent. The final product is more resinous or less rubbery as the percent heterocyclic nitrogen base is increased in the copolymer. The nature of the cured binder will be dependent upon the nature of the copolymer, the degree of quaternization, etc. as is well understood in the art. Some examples of suitable heterocyclic nitrogen containing bases include 2-vinylpyridine, 3-vinylpyridine, 4-vinylpyridine, 2,4,6 - trimethyl - 3 - vinylpyridine, 3,4,5,6 - tetramethyl- 2 - vinylpyridine, 3 - ethyl - 5 - vinylpyridine, 2 - methyl- 5 - vinylpyridine, 2,6 - diethyl - 4 - vinylpyridine, 2 - isopropyl - 4 - nonyl - 5 - vinylpyridine, 2 - methyl - 5- undecyl - 6 - vinylpyridine, 3 - dodecyl - 2,4 - divinylpyridine, 2,4 - dimethyl - 5,6 - diphenyl - 3 - vinylpyridine, 3,5 - di(alphamethylvinyl)pyridine, similar mono and di substituted alkene and alkadiene pyridines and like quinolines.

Many plasticizers for rubbery polymers are known in the art. Among these plasticizers which have found wide acceptance in the art and are useful as the plasticizer in this invention are dioctyl phthalate, benzophenone, amylbiphenyl, dibutyl Carbitol formal, trioctyl phosphate, tricresyl phosphate, etc. The plasticizer is a liquid under the conditions existing in the mixer, and is compatible with the rubber. The amount used is preferably sufficient to wet the quantity of oxidizer used. This will be from 1 to 25 parts by volume per 100 parts of filler, with 3-10 parts being more generally required for this purpose. The Mooney value of the rubbery material will generally dictate the amount of plasticizer to be used. That is sufficient plasticizer is used to soften the rubber sufficiently that it can be masticated. However, regardless of the rubber Mooney, sufficient plasticizer must be used to wet the filler as described. In the case of very low Mooney value rubbers, only a minimum amount of plasticizer required to wet the filler will be used. Even though this amount of plasticizer would not be otherwise required, the effect on the cured composition will be negligible as is understood by those in the art.

Some filler materials to which the invention is applicable have been previously indicated. Mixtures of these fillers can be used. As has been indicated, this invention is particularly applicable to incorporating the oxidant into a rubbery binder in the preparation of solid propellant grain. The oxidants applicable in the practice of this invention are any of those crystalline oxidizers which are substantially insoluble in the binder and binder components such as ammonium nitrate, ammonium perchlorate, potassium nitrate, sodium nitrate and the like. Mixtures of oxidizers are also applicable as are mixtures of oxidizer and other filler such as carbon black. Generally the filler materials will be powdered to particles ranging in average size of from 1 to 800 microns and the general practice for fillers being to use them at an average particle size of less than 150 microns. The amount of solid filler can be employed over a wide range say from 25 to 600 volumes per 100 volumes of the binder. In the preparation of propellants, where the solid material is an oxidant, 40 to 600 volumes of oxidant will be used per 100 volumes of binder.

Vulcanizing agents are well known in the art and include sulfur, p,p'-di-benzoylquinonedioxime, p - quinonedioxime, magnesium oxide, sulfur dichloride, sulfur monochloride, alkyl phenol monosulfide, alkyl phenol disulfide, etc. The sulfur containing materials are generally preferred. Many of the accelerator-activators also function as vulcanizing agents, for example, litharge, red lead, lead silicate, etc.

There are also many known accelerator-activators known in the art. Examples of such compounds include lead oxide, zinc oxide, magnesium oxide, mixtures of magnesium oxide and carbon, lead carbonate, hydrated lime, lead silicate, dibutyl ammonium oleate, oleic acid, dibenzylamine, linseed oil, fatty acids, rosin acids, triethanolamine, zinc stearate, etc.

Many accelerators are known to those skilled in the art and any of these accelerators can be used. Examples of such materials include 2-mercaptothiazoline, formaldehyde p-toluidine, mixed diarylguanidine, piperidinium pentamethylene dithiocarbamates, benzothiazyl disulfide, zinc dibenzyl dithiocarbamate, zinc dibutyl dithiocarbamate, zinc diethyl dithiocarbamate, 2-mercaptobenzothiazole, dibutyl xanthogen disulfide, diphenylguanidine, tetraethyl thiuram disulfide, and many others.

The antioxidants which are also known in the art include hydroquinone monobenzyl ether, phenyl - betanaphthylamine, polymerized trimethyldihydroquinoline, heptylated diphenylamine, glycerol monoester of salicylic acid, hexachloronaphthalene, poly diaryl amine, hydrocarbon waxes, etc.

Typical dispersing or wetting agents include dioctyl ester of sodium sulfosuccinic acid, diethylene glycol monostearate, glyceryl monolaurate, free base of long chain fatty acid amide containing multiple amino groups and hydrochlorides of these amides, sulfonated petroleum hydrocarbons and the like.

Typical quaternizing agents include the various alkyl halides such as methyl iodide, methyl bromide, ethyl iodide, propyl iodide, hexyl iodide, nonyl bromide and cetyl bromide; the various alkylene halides such as methylene iodide, ethylene bromide, propylene chloride, butene bromide, and octene bromide; the various substituted alkanes, necessarily including the above alkyl and alkylene halides, which contain at least one hydrogen attached to a carbon atom such as bromoform, chloroform, 1,3-dichloropropane, 1,2 - dibromobutane, ethylene chlorohydrin, iodoform, acetyl chloride, chloracetyl chloride; alkyl sulfates such as methyl sulfate, ethylsulfate; and the various substituted aromatic compounds such as picryl chloride, benzoyl chloride, benzene sulfonyl chloride, benzal chloride, benzotrichloride, methylbenzene sulfonate. Other quaternizing agents include the polyhalogenated cycloalkanes such as hexachlorocyclopentadiene.

Burning rate catalysts include rouge, Prussian blues, ammonium dichromate, Milori blue, iron blues and compounds of transition metals.

It is, of course, within the scope of this invention to use only some of these foregoing ingredients and to incorporate other compounding ingredients into the blend. Mixtures of the various agents can be used, all of which is fully understood by those skilled in the art. The list of rubbers, plasticizers, fillers and other compounding ingredients is for the purpose of illustrating the wide application of my invention and is not to be considered limiting.

As has been said my invention is particularly adapted to the preparation of a solid propellant grain. For that reason I will illustrate my invention further by the following examples wherein solid propellant grains are prepared. All parts are by weight unless otherwise specified.

*Example I*

Three propellant batches of the following composition were mixed in a Baker-Perkins mixer of 0.7 gallon capacity in a mixing room maintained at a relative humidity of 18 percent. The rubber used was a 90/10 (charge) butadiene 2-methyl-5-vinylpyridine copolymer with a viscosity of 20 Mooney (ML–4) prepared by emulsion polymerization at 41° F. and containing 10 parts by weight of Philblack "A" (carbon black) per 100 parts of rubber. The mixing procedure varied for each batch.

| Ingredient | Grams | Mixing Time, Minutes | | |
|---|---|---|---|---|
| | | Batch 1 | Batch 2 | Batch 3 |
| Butadiene-methylvinylpyridine copolymer containing carbon black (10 pts./100 pts. rubber) | 228 | 5 | 5 | 5 |
| Epichlorohydrin | 7.6 | 2 | 2 | 2 |
| Sulfur | 3.22 | 2 | 2 | |
| Zinc oxide | 5.7 | | | |
| Aerosol OT [1] | 1.9 | 2 | 2 | 4 |
| Flexamine [2] | 5.7 | | | |
| Milori Blue | 34 | 4 | 4 | 4 |
| Pentaryl A [3] | 19 | 1 | 7 | |
| Benzophenone [4] | 19 | | | 9 |
| Ammonium nitrate [5] | 1,402 | 5 | 35 | |
| Butyl-8 [6] | 3.8 | [7] 20 | [7] 20 | [7] 20 |
| Total time mixing | | 41 | 79 | 44 |
| Total time including adding ingredients [8] | | 50 | 95 | 56 |

[1] Dioctyl ester of sodium sulfosuccinic acid.
[2] Physical mixture containing 65 percent of a complex diarylamine-ketone reaction product and 35 percent of N,N'-diphenyl-p-phenylenediamine.
[3] Amylbiphenyl (plasticizer).
[4] Liquefies upon addition (plasticizer).
[5] Ground in Mikropulverizer at 14,000 r.p.m. and stored in air-tight container over silica-gel; average particle size, 80 microns.
[6] Dithiocarbamate-type rubber accelerator.
[7] Includes a final blending period, 10 minutes under the ram followed by 10 minutes under a vacuum.
[8] Includes time for stopping and starting mixer, putting on top, etc.

The total volume of binder which includes the copolymer less carbon black, epichlorohydrin, sulfur, zinc oxide, Aerosol OT, Flexamine, Butyl 8, Pentaryl A and benzohexone was 265 cc. The total volume of solids including Milori blue, oxidant, and carbon black was 871 cc. The ratio of solids to binder was 330 volumes solids per 100 volumes binder. The volume of oxidizer was 845 cc. and the volume of plasticizer was 42 cc. or 4.8 volumes solids per volume plasticizer.

The mixing procedure for batch one was as follows: The rubber was kneaded for 5 minutes under a partial vacuum of 26 inches of mercury to remove any entrained moisture. The temperature of the mass at the end of the mixing period was 150° F. The remaining ingredients were added in the following order: (1) epichlorohydrin, (2) sulfur, (3) zinc oxide, Aersosol OT, and Flexamine, (4) Milori blue, (5) Pentaryl A and benzophenone, (6) ammonium nitrate in three substantially equal portions running the mixer for only sufficient length of time to wet the first two portions, (7) Butyl-8. In the first four steps, the mixing was continued after each addition until complete incorporation of the added ingredients took place. In step 5, mixing was discontinued after only a small portion of the plasticizer had been incorporated into the rubber and while the lumps of rubber formed following the initial mixing with plasticizer were still partially immersed in the remaining plasticizer. In step 6, mixing was continued after the addition of each portion of ammonium nitrate only until the ammonium nitrate was wet with the plasticizer. A small amount of the ammonium nitrate would be incorporated into the rubber at the same time. After the addition of the final portion of ammonium nitrate, mixing was continued until it was completely incorporated. After the addition of the last ingredient (step 7), a compressive ram was applied to the mixer and mixing continued for an additional 10 minutes to ensure complete and even dispersion of all the ingredients. A final mixing period of 10 minutes was carried out under a partial vacuum of 26 inches of mercury below atmospheric to remove entrained moisture and air. The temperature of the mass at the end of the mixing period was 145° F.

The mixing procedure for batch 2 was as follows: The rubber was kneaded for 5 minutes under a partial vacuum of 26 inches of mercury to remove entrained moistures. The temperature of the mass at the end of the mixing period was 160° F. The ingredients were added in the following order, with mixing being continued in each case until complete incorporation took place, and with discontinuance of mixing while the ingredient was being added: (1) epichlorohydrin, (2) sulfur, (3) zinc oxide and Aerosol OT, (4) Flexamine, (5) Milori blue, (6) Pentaryl A and benzophenone, (7) ammonium nitrate, (8) Butyl-8. With the exception of the ammonium nitrate, the total amount of each ingredient was added all at once. The ammonium nitrate was added in three increments of substantially equal portions, each of which was substantially completely incorporated before the next portion was added. After the addition of the last ingredient (step 8), a compressive ram was applied to the mixer and mixing continued an additional 10 minutes to ensure complete and even dispersion of all the ingredients. A final mixing period of 10 minutes was carried out under a partial vacuum of 26 inches of mercury below atmospheric to remove the entrained moisture and air. The temperature of the mass was 145° F. at the end of the mixing period.

With such a large percentage of oxidant, it is necessary by the procedure of batch 2, that the oxidant be added in not less than three increments. In general, a larger number of increments will ordinarily be used.

The mixing procedure for batch 3 was as follows: The rubber was kneaded for 5 minutes under a vacuum of 29 inches of mercury to remove entrained moisture. The temperature at the end of the mixing period was 140°. The ingredients were then added in the following order: (1) epichlorohydrin, (2) sulfur, Aerosol OT, zinc oxide and Flexamine, (3) Milori blue, (4) Pentaryl A, benzophenone and ammonium nitrate mixture, (5) Butyl-8. The ammonium nitrate was first mixed with the two plasticizers Pentaryl A and benzophenone and these ingredients added as the mixture. With the exception of the ammonium nitrate plasticizer mixture, the total amount of each ingredient was added all at once. The ammonium nitrate mixture was added in 4 increments of substantially equal portions. In each step, the mixing was continued after each addition until partial incorporation of the added ingredients took place. After the addition of the last ingredient, a compressive ram was applied and mixing continued for an additional 10 minutes to ensure complete and even dispersion of all the ingredients. A final mixing period of 10 minutes was carried out under a partial vacuum of 29 inches of mercury below atmospheric to remove entrained air and moisture. The final temperature was 140° F.

It can be seen by comparing the time required for mixing the plasticizers plus oxidizer in the three runs that considerable time is saved if the oxidizer is allowed to become wet with plasticizer before complete incorporation. Not only is this method less time consuming, but it also has the advantage of no failures of the oxidizer to incorporate and at no disadvantage to the propellant grain.

*Example II*

A second series of runs were made to show the effect of wetting the oxidant prior to adding the wetted material to the mixer. The conditions were the same as that described in Example I and the copolymer was prepared in the same manner. The blends were the same, the variation being only in the manner of mixing. The following table shows the mixing time for each of four batches.

| Ingredient | Grams | Mixing Time, Minutes | | | |
|---|---|---|---|---|---|
| | | Batch 4 | Batch 5 | Batch 6 | Batch 7 |
| Copolymer | 655 | 10 | 10 | 10 | 10 |
| Sulfur | 4.13 | | | | |
| Zinc Oxide | 16.5 | 3 | 3 | 3 | 3 |
| Aerosol OT [1] | 5.52 | | | | |
| Elexamine [1] | 16.5 | | | | |
| Milori Blue | 100 | 3 | 3 | 3 | 3 |
| Dibutyl Carbitol Formal | 108 | 1 | 1 | 27.5 | 4.5 |
| Ammonium Nitrate [1] | 4,170 | 5 | | 12 | |
| Butyl-8 [1] | 10.8 | 20 | 20 | 20 | 20 |
| Total Mixing Time | | 42 | 37 | 75.5 | 40.5 |
| Total time including down time for adding ingredients | | 47.5 | 42 | 81.5 | 46.5 |

[1] See Example I.

In all of the above batches or runs the mixing procedure was the same except for the incorporation of the plasticizer (dibutyl Carbitol formal) and the ammonium nitrate. The polymer was first kneaded for 10 minutes under 29 inches of vacuum. The sulfur, zinc oxide, Aerosol OT, and Flexamine was then added and incorporated in the rubber and this was followed by the addition and incorporation of the Milori blue. The plasticizer and ammonium nitrate was then incorporated as explained below. The Butyl-8 was then added and mixed under a ram head for 10 minutes and this followed by a further mixing for 10 minutes under a vacuum of 29 inches of mercury. The vacuum is given as inches below atmospheric.

In batch 4, the plasticizer was only partially incorporated and the ammonium nitrate was added in 5 equal portions with only a partial incorporation after each addition until the final addition is made when complete incorporation takes place.

In batch 5, the plasticizer and ammonium nitrate were first completely blended and the material added all at once.

In batch 6, the plasticizer was first completely incorporated and the ammonium nitrate added in 5 equal portions with each portion being incorporated prior to the next addition.

In batch 7, the plasticizer and ammonium nitrate were first completely blended and the blended material added in 5 equal portions with each portion being completely added prior to the next addition.

For the above table, it is clearly shown that the wetting of the ammonium nitrate with plasticizer facilitates the incorporation of the ammonium nitrate into the binder. While these data show some savings in time by wetting the ammonium nitrate with plasticizer outside the blender, those skilled in the art will recognize the even greater saving in time and labor that would result in a large scale commercial operation.

I claim:
1. A method of preparing a rocket propellant grain comprising 40 to 600 parts by volume of a solid inorganic oxidizing salt per 100 parts of a rubber binder, said method comprising wetting said oxidant with 1 to 25 volume parts of a rubber plasticizer per 100 parts of said oxidant, incorporating the wet oxidant in said rubber, molding the resulting admixture into a rocket grain and curing said grain.

2. The method of claim 1 wherein the rubber is a copolymer of butadiene and 2-methyl-5-vinylpyridine, the plasticizer is a blend of equal parts by weight of amylbiphenyl and benzophenone and the oxidant is ammonium nitrate.

3. A method of preparing a rocket propellant grain which comprises crushing a solid inorganic oxidizing salt to an average particle size of one to eight hundred microns, wetting sufficient crushed oxidant to provide 40 to 600 volumes oxidant per 100 volumes binder in the finished grain with 1 to 25 volume parts of a rubber plasticizer per 100 parts of said solid oxidant, mixing the resulting wet oxidant with 100 parts of a rubber having a Mooney ML–4 value of 10 to 60, forming a rocket grain from resulting admixture and curing the resulting grain.

4. A method of preparing a propellant grain for a rocket engine which comprises adding 1 to 100 volume parts of a rubber plasticizer to 100 parts of a rubber having a Mooney ML–4 value of 10 to 60, only partially incorporating the plasticizer into the rubber, crushing sufficient solid inorganic oxidizing salt to mix with the plasticizer and rubber to produce a mixture containing 40 to 600 volumes oxidizer, said oxidant being crushed to an average particle size of 1 to 800 microns, adding the crushed oxidant in several increments to the plasticizer-rubber mixture, each increment being thoroughly wetted with plasticizer and only partially dispersed in said rubber, adding the remaining oxidant as a final increment, completely dispersing the remaining wetted oxidizer and plasticizer into the rubber, forming the propellant grains and curing the resulting grains.

5. In a method of preparing a rocket propellant grain comprising a rubber binder having incorporated therein 25 to 600 parts by volume of a solid inorganic oxidizing salt per 100 volumes of said rubber binder, the improvement comprising wetting said oxidant with 1 to 25 volumes of plasticizer per 100 volumes of said oxidant and in an amount sufficient to wet said oxidant prior to dispersing said oxidant in said rubber.

References Cited in the file of this patent

UNITED STATES PATENTS

| 2,434,872 | Taylor et al. | Jan. 20, 1948 |
| 2,495,216 | Longwell et al. | Jan. 24, 1950 |
| 2,530,852 | Bixby | Nov. 21, 1950 |
| 2,597,641 | Hull et al. | May 20, 1952 |
| 2,605,255 | Nadler | July 29, 1952 |
| 2,639,275 | Vickers et al. | May 19, 1953 |
| 2,653,925 | Olin | Sept. 29, 1953 |
| 2,662,927 | Nadler | Dec. 15, 1953 |

FOREIGN PATENTS

| 655,585 | Great Britain | July 25, 1951 |